July 8, 1969     R. SIEGEL     3,454,332
CORNEAL PLASTIC CONTACT LENS WITH COLORED PERIPHERAL ZONE
Filed Nov. 3, 1966

*INVENTOR.*
ROBERT SIEGEL
BY: *Kelman and Berman*

AGENTS

United States Patent Office
3,454,332
Patented July 8, 1969

3,454,332
CORNEAL PLASTIC CONTACT LENS WITH COLORED PERIPHERAL ZONE
Robert Siegel, 260 E. Walnut St., Long Beach, N.Y. 11561
Filed Nov. 3, 1966, Ser. No. 591,849
Int. Cl. G02c 7/04
U.S. Cl. 351—162      5 Claims

ABSTRACT OF THE DISCLOSURE

A corneal plastic contact lens having a transparent central zone and a colored peripheral zone formed with a multiplicity of spherical voids arranged along grain boundaries of the bonded granular material of which the peripheral zone consists, and much smaller than the grains. The lens is made from a rod-shaped blank obtained by curing a mixture of acrylic resin granules, coloring matter, and acrylic monomer about a rod of optically clear acrylic resin.

---

Figure 1:
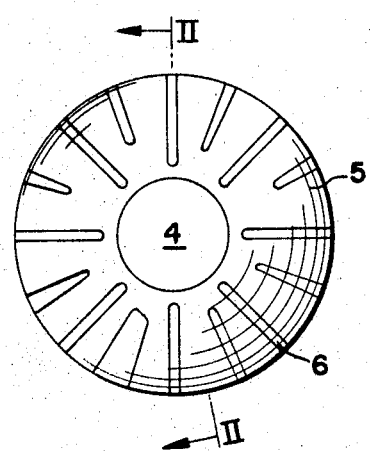

This invention relates to plastic contact lenses, particularly to a corneal contact lens having an iris portion differing in optical properties from the pupil portion, and to a method of making the lens.

A corneal contact lens has the approximate shape of a circular segment of a hollow sphere. The deviations from a precisely circular contour and from a uniform radius of curvature of the outer surface are normally small, and may be disregarded for the purpose of this discussion. The outer surface is continuously convex, that is, each element thereof is convex, and the inner surface is continuously concave. The substantially circular rim which connects the inner and outer surfaces is rounded to avoid injury to the eye, and the radius of curvature of the exposed rim in a plane through the optical axis of the lens is but a small fraction of the radii of curvature of the outer and inner lens faces.

Light incident on the lens rim is reflected within a transparent lens and into the pupil of the wearer in a pattern distinctly different from the normal path of light through the lens. Only few wearers of contact lenses of low dioptric power are disturbed by or even aware of the parasitic reflections from the lens rim. The reflections are a frequent source of annoyance when a contact lens of high positive refractive power compensates for aphakia.

An object of the invention is the provision of a corneal contact lens which eliminates or mitigates parasitic reflections from the lens rim into the pupil of the wearer.

According to a basic feature of this invention, the peripheral zone of the lens is colored or pigmented throughout its thickness, thereby blocking or impeding propagation of reflections from the rim toward the central portion of the lens which is optically homogeneous, and usually fully transparent and colorless.

The diameter of a corneal lens is normally about 10 millimeters, and the clear central zone in the lens of my invention is normally 4 to 5 millimeters in diameter. These dimensions may be modified somewhat under special conditions. A larger transparent center in the lens is sometimes desirable for cosmetic reasons, and a smaller center may be necessary for medical reasons to compensate for a deformed pupil of the wearer, for example, after a cataract operation.

It is known to provide corneal contact lenses with an opaque or almost opaque portion overlying the wearer's iris. The known lenses are made by laminating an annular colored disc over a body of clear plastic which constitutes the center of the lens and extends to the very rim. The known lenses cannot prevent the reflection of parasitic reflections from the rim into the wearer's pupil. They are relatively thick because all mechanical stresses must be carried by the clear portion alone to avoid delamination, and failure of the bond between the two components is not infrequent even with heavy and relatively rigid laminated lenses.

The contact lens of my invention is a unitary body of synthetic polymer resin whose peripheral zone has a substantially smaller light transmissivity than the central zone which is normally optically aligned with the wearer's pupil. The composition of each portion of the lens is microscopically uniform in the direction of lens thickness from one exposed face to the other.

Figure 2:
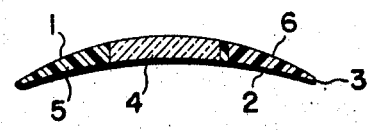

Other features of my contact lens and the method of making the same will be readily apparent from consideration of the following specification relating to the annexed drawing in which:

FIG. 1 shows a contact lens of the invention in plan view;
FIG. 2 shows the lens of FIG. 1 in section on the line II—II; and
FIG. 3 illustrates a mold for making a lens blank in axial section.

Referring initially to FIGS. 1 and 2, there is seen a corneal contact lens having the usual meniscus shape bounded by an outer convex spherical surface 1, and inner concave spherical surface 2, and by a circular rim 3 which is rounded in the axially sectional view of FIG. 2 to a radius of curvature which is but a small fraction of the radii of curvature of the surfaces 1, 2.

The central portion 4 of the lens consists of clear acrylic polymer of optical quality. The annular peripheral lens portions consists mainly of colored acrylic resin 5 in which sections 6 of darker colored acrylic resin are embedded. As is evident from FIG. 2, the color is uniform through the thickness of the lens in the main peripheral portion 5 and in the darker section 6. The latter are elongated from the rim 3 in a direction approximately toward the axis of the lens.

Figure 3:
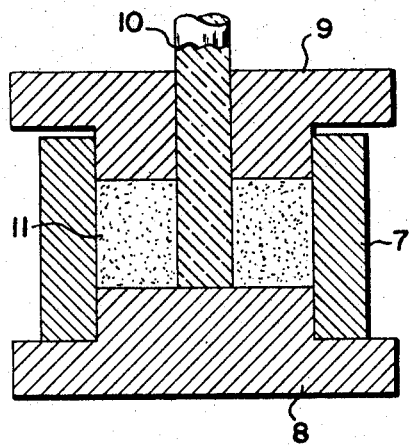

The preparation of a lens blank from which the lens of FIGS. 1 and 2 may be cut, ground, and polished in a conventional manner is illustrated in FIG. 3 which shows a mold consisting of a cylindrical sleeve 7 equipped with a bottom plug 8 and a top plug 9 movably inserted in the sleeve 7. A central bore in the top plug 9 slidably receives a rod 10 of optical-quality acrylic resin, mainly polymethyl methacrylate, having a diameter of 4 to 5 millimeters, which extends through the mold cavity and abuts against the inner face of the bottom plug 8. The remainder of the mold cavity is filled with a finely granular acrylic molding powder 11.

The powder 11 is a staple article of commerce which is employed by dental technicians in the preparation of dental prostheses. It is sold together with a liquid mainly consisting of acrylic monomers, such as methyl methacrylate. The powder also contains a catalyst, or the oxidizing ingredient of a redox catalyst system whose reducing component is contained in the liquid monomer composition. When the powder and the liquid are mixed, the catalyst causes polymerization of the monomer. The American Dental Association maintains a list of Certified Dental Materials which includes acrylic compositions. The materials on that list which satisfy the above description are suitable for the purpose of my invention.

A dental acrylic material which has been used successfully in preparing contact lenses of this invention is sold under the trade name Permatone and is stated by the manufacturer to include cross-linking agents. A mixing rate of 3.5 parts powder to 1 part liquid by volume is recommended by the manufacturer, but I have found that this mixing ratio, while useful for general guidance, is not critical. The amount of monomer composition must be small enough so as not to dissolve the polymer grains or the rod 10 to a significant extent.

In preparing a lens blank, I first assemble the top plug 9 with the sleeve 7 and the rod 10 on a flat horizontal support so that the outer face of the plug 9 is directed downward, and the end face of the rod 10 is flush with the plug face. The upwardly open annular space between the axial walls of the sleeve 7 and rod 10 is partly filled with a dry mixture of the acrylic polymer powder with coloring matter, and the bottom plug 8 is inserted. The two plugs are then pressed axially toward each other between the fingers of one hand, whereby the rod 10 is moved outward of the mold cavity through the plug 9, the acrylic polymer powder is packed about the rod 10, and air is expelled from the mold. FIG. 3 shows the mold assembly in this stage of blank preparation.

The plug 9 is then lifted while maintaining the remainder of the mold assembly in the illustrated condition, the few drops of liquid monomer composition necessary for impregnating the powder are introduced into the mold by means of a small pipette. The liquid readily wets the powder, and therefore quickly fills the interstices between the polymer grains. The illustrated relative position of the plugs is then restored by finger pressure.

Air may further be removed by placing the mold and its contents in a closed chamber, and by alternatingly applying vacuum and elevated pressure to the chamber in a manner conventional in itself. Enough air must be removed from the molding composition to avoid the formation of extended intergranular voids of irregular configuration in the finished blank which would affect mechanical strength, but complete removal of air is neither necessary nor actually desirable. Applying the vacuum of a water jet pump (abt. 15 mm. Hg) for about 5 minutes, or applying external air pressure of about 45 lbs. per sq. in., or both in sequence may be adequate.

The contents of the mold are then cured at elevated temperature without external pressure other than that due to the small weight of the mold parts, and to the frictional resistance of the mold parts against relative movement in response to the thermal expansion of the acrylic mixture.

The recommended curing cycle is 160° to 165° F. for 90 minutes, followed by 30 minutes at 212° F., or at least eight hours at 160–165° F. I have found that the material cures satisfactorily without undesirable secondary effects even if this curing schedule is not closely adhered to. It is important, however, that the curing or polymerization temperature should not reach the melting point of the rod 10, of the resin powder, or of the normally solid material produced by polymerization of the liquid monomer composition.

The molding removed from the disassembeld mold is a unitary body of acrylic resin in which a clear central portion is integrally welded or bonded to a colored peripheral portion. The molding is next slotted by means of a small circular saw. The saw cuts are made in the colored portion only from the periphery inward in an approximately radial direction. The number, width, length, and distribution of the slots may be selected as needed.

The slotted molding is assemled with the sleeve 7 and the top plug 9 in the manner described above, and additional acrylic molding powder containing more coloring matter than the first batch or different coloring matter is packed into the slots and moistened with liquid monomer composition. A second molding operation is performed in a manner obvious from the preceding description. The distribution of the several optical zones in the finished blank is evident from FIG. 1. The blank has a transparent core surrounded by an annular colored zone in which radially directed elements of contrasting color are embedded. As is sometimes unavoidable in the described manner of preparing the blank, some of the last-cured material may extend over the entire bottom surface of the blank in a thin layer without affecting further processing.

The blank is cut, ground, and polished in the usual manner, and the lens shown in FIGS. 1 and 2 is obtained. When viewed under a microscope, the colored zones of the lens clearly show the original grains of polymer material. The intergranular spaces are filled with the polymerized material of the originally liquid monomer composition in which the coloring matter is distributed. The intergranular material shows scattered spherical voids very much smaller than the average size of the grains, and believed to be filled with residual air. The colored zone is integrally welded to the clear zone formed by material of the original rod 10.

When the contact lens is broken by pressure applied to diametrically opposite rim portions or otherwise, failure never occurs at the boundaries between the several zones of different appearance, but right across the boundaries.

The coloring matter in the peripheral zone of the lens contributes materially to the prevention of parasitic reflections from the rim into the pupil of the wearer, but the grain boundaries and voids in themselves are effective in the same manner, and permit the desired result to be obtained with relatively little coloring matter. The amount and color of the latter may therefore be selected freely to produce optimum cosmetic effects. The grain structure and the voids, while not visible to the naked eye, simulate the appearance of a natural iris in conjunction with the pattern of color distribution produced by the contrasting sections 6. It is not necessary to cover the colored zones of the lens with a layer of transparent plastic to simulate the reflection in depth characteristic of the human iris.

The coloring matter is preferably blended dry with the molding powder. The appearance achieved by the use of dyes dissolved in the monomer composition is distinctly less satisfactory. The chemical nature of the coloring matter is relevant only to the extent that it should not interfere with the polymerization, and preliminary tests are necessary to establish this fact. It is furthermore prudent to avoid coloring matter which is toxic or which is known to irritate the cornea although the material is firmly bonded in the intergranular polymer, and I have not been able to leach even traces of coloring matter from lenses of this invention immersed in saline solutions of various concentrations over extended periods. The preferred coloring materials are those commercially available as powders for chlidren's use in schools and nurseries. They are ground sufficiently fine to disperse readily in water, but tests with coarser pigments have shown that the particle size of the coloring matter has no significant effect on the appearance of the lens.

Acrylic resins are the only plastics available to me at this time which have the necessary optical properties for use in the refractive central portion of a contact lens. This invention, however, is not limited to the specific type of plastic used.

A colorless central zone is used in most contact lenses but acrylic lenses colored to block passage of selected portions of the spectrum or to reduce the overall amount of light reaching the eye are well known. The use of a colored rod 10 in the aforedescribed method produces a corresponding lens whose central zone is not fully transparent.

Partial blocking of the pupil is necessary in certain malformations or injuries of the eye, and the necessary modification of the rod 10 will readily suggest itself to those skilled in the art.

While it is most convenient to cut, grind, and polish the optical surfaces of the lens in the molded blank, an impression taken from the eye of the prespective wearer may be inserted in the mold shown in FIG. 3 over the inner face of either plug 8, 9 to mold a desired contour into the blank.

What I claim is:

1. A corneal contact lens having the approximate shape of a circular segment of a thin-walled hollow sphere and having an exposed continuously convex, outer face, an exposed, continuously concave inner face, said faces being separated by the thickness of said lens, the lens having an annular peripheral zone and a central zone substantially centered in said peripheral zone, the central zone being substantially transparent, and the peripheral zone having a light transmissivity substantially smaller than the light transmissivity of said central zone, the composition of each portion of said lens being substantially uniform in the direction of the thickness thereof from one of said faces to the other, and said peripheral portion being formed with a multiplicity of substantially spherical voids too small to be visible to the naked eye.

2. A lens as set forth in claim 1, which is a unitary body mainly consisting of acrylic polymer resin.

3. A lens as set forth in claim 1, wherein said peripheral zone consists essentially of grains of clear polymer resin, coloring matter, and a bonding layer of said resin, said bonding layer being interposed between said grains and integrally connecting the same and said coloring matter to form therewith an integral, unitary body, said central zone consisting of a single homogeneous phase of said resin and being integrally bonded to said peripheral zone by said bonding layer.

4. A lens as set forth in claim 3, wherein said peripheral zone has a plurality of circumferentially offset sections differing from each other in the coloring matter contained therein, the coloring matter content of each section being substantially uniform throughout the thickness of the lens.

5. A lens as set forth in claim 3, said voids being located in said bonding layer between said grains and having an average size much smaller than the average size of said grains.

References Cited

UNITED STATES PATENTS

| | | | |
|---|---|---|---|
| 2,563,462 | 8/1951 | Galeski | 3—13 |
| 2,593,150 | 4/1952 | Jardon | 3—13 |

FOREIGN PATENTS

| | | |
|---|---|---|
| 583,952 | 1/1946 | Great Britain. |
| 1,115,140 | 12/1955 | France. |
| 35,177 | 1/1965 | Germany. |

DAVID H. RUBIN, *Primary Examiner.*

U.S. Cl. X.R.

3—13; 264—1; 351—160, 177